(12) United States Patent
Oh et al.

(10) Patent No.: US 7,388,933 B2
(45) Date of Patent: *Jun. 17, 2008

(54) WIRELESS COMMUNICATION SYSTEM HAVING ADAPTIVE THRESHOLD FOR TIMING DEVIATION MEASUREMENT AND METHOD

(75) Inventors: Hyun Seok Oh, Incheon (KR); Kalpendu R. Pasad, Hicksville, NY (US); John W. Haim, Baldwin, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 403 days.

This patent is subject to a terminal disclaimer.

(21) Appl. No.: 11/000,304

(22) Filed: Nov. 30, 2004

(65) Prior Publication Data

US 2005/0078771 A1    Apr. 14, 2005

Related U.S. Application Data

(63) Continuation of application No. 10/209,398, filed on Jul. 30, 2002, now Pat. No. 6,873,662.

(60) Provisional application No. 60/357,033, filed on Feb. 14, 2002.

(51) Int. Cl.
*H04L 7/00* (2006.01)

(52) U.S. Cl. .................................. 375/317; 375/358

(58) Field of Classification Search ................. 375/147, 375/149, 316, 317, 354, 358
See application file for complete search history.

(56) References Cited

U.S. PATENT DOCUMENTS

| 5,251,233 | A | 10/1993 | Labedz et al. |
| 5,642,377 | A | 6/1997 | Chung et al. |
| 5,905,757 | A | 5/1999 | Kundmann et al. |
| 6,144,709 | A | 11/2000 | Piirainen et al. |
| 6,873,662 | B2 * | 3/2005 | Oh et al. ................. 375/317 |
| 2001/0036168 | A1 * | 11/2001 | Terry ......................... 370/337 |
| 2002/0071415 | A1 * | 6/2002 | Soulabail et al. ......... 370/337 |

FOREIGN PATENT DOCUMENTS

| EP | 0892504 | 1/1999 |
| EP | 0 942 543 A | 9/1999 |
| EP | 1211907 | 6/2002 |
| GB | 2307154 | 5/1997 |
| JP | 2001169345 | 6/2001 |

(Continued)

OTHER PUBLICATIONS

3rd Generation Partnership Project; Technical Specification Group Radio Access Network; Physical Layer Procedures (TDD) (Release 1999) 3GPP TS 25.224 V3.9.0 (Dec. 2001).

(Continued)

*Primary Examiner*—David B. Lugo
(74) *Attorney, Agent, or Firm*—Volpe and Koenig, PC

(57) ABSTRACT

A system and method of wireless communication determines received signal timing deviation which is used to generate a timing advance for adjusting wireless transmit receive unit (WTRU) transmissions. An adaptive threshold for measuring the timing deviation is set based on the energy level of received WTRU signals. WTRU signal samples which exceed the threshold are evaluated to determine timing deviation.

24 Claims, 8 Drawing Sheets

FOREIGN PATENT DOCUMENTS

| | | |
|---|---|---|
| JP | 2001339359 | 12/2001 |
| JP | 2002016529 | 1/2002 |
| WO | 00/79750 | 12/2000 |
| WO | 00/79751 | 12/2000 |
| WO | 02/11480 | 2/2002 |

OTHER PUBLICATIONS

D'Aria et al., "Modeling and Simulation Of The Propagation Characteristics Of The 990 Mhz Narrowband-TDMA CEPT/GSM Mobile Radio," pp. 631-639, *39th IEEE Vehicular Conference 1989*, (May 1989).

3GPP, *3rd Generation Partnership Project; Technical Specification Group Radio Access Network; Requirements for Support of Radio Resource Management (TDD) (Release 4)*, 3GPP TSS 25.123 v4.4.0 (2002-03), pp. 1-12, 71-95. (Mar. 2003).

3GPP, *3rd Generation Partnership Project; Technical Specification Group Radio Access Network; UTRAN Iub/Iur interface user plane protocol for DCH data streams (Release 4)*, 3GPP TS 25.427 v4.4.0 (2002-12), pp. 1-4, 13, 28, (Dec. 2002).

3GPP, *3rd Generation Partnership Project; Technical Specification Group Radio Access Network; UTRAN $I_{ub}$ Interface User Plane Protocols for Common Transport Channel Data Streams (Release 4)*, 3GPP TS 25.435 v4.4.0 (2002-03), pp. 1-5, 24.

3rd Generation Partnership Project; "Technical Specification Group Radio Access Network; Physical Layer Procedures (TDD) (Release 1999)," 3GPP TS 25.224 v3.2.0 (Mar. 2000).

3rd Generation Partnership Project; "Technical Specification Group Radio Access Network; Physical Layer Procedures (TDD) (Release 1999)," 3GPP TS 25.224 v3.13.0 (Sep. 2003).

3rd Generation Partnership Project; "Technical Specification Group Radio Access Network; Physical Layer Procedures (TDD) (Release 4)," 3GPP TS 25.224 v4.3.0 (Jan. 2002).

3rd Generation Partnership Project; "Technical Specification Group Radio Access Network; Physical Layer Procedures (TDD) (Release 4)," 3GPP TS 25.224 v4.11.0 (Sep. 2004).

3rd Generation Partnership Project; "Technical Specification Group Radio Access Network; Physical Layer Procedures (TDD) (Release 5)," 3GPP TS 25.224 v5.8.0 (Sep. 2004).

3rd Generation Partnership Project; "Technical Specification Group Radio Access Network; Physical Layer Procedures (TDD) (Release 6)," 3GPP TS 25.224 v6.2.0 (Sep. 2004).

3rd Generation Partnership Project; "Technical Specification Group Radio Access Network; UTRAN Overall Description (Release 1999)," 3GPP TS 25.401 v3.3.0 (Jun. 2000).

3rd Generation Partnership Project; "Technical Specification Group Radio Access Network; UTRAN Overall Description (Release 1999)," 3GPP TS 25.401 v3.8.0 (Oct. 2001).

3rd Generation Partnership Project; "Technical Specification Group Radio Access Network; UTRAN Overall Description (Release 1999)," 3GPP TS 25.401 v3.10.0 (Jun. 2003).

3rd Generation Partnership Project; "Technical Specification Group Radio Access Network; UTRAN Overall Description (Release 4)," 3GPP TS 25.401 v4.2.0 (Oct. 2001).

3rd Generation Partnership Project; "Technical Specification Group Radio Access Network; UTRAN Overall Description (Release 4)," 3GPP TS 25.401 v4.6.0 (Jan. 2003).

3rd Generation Partnership Project; "Technical Specification Group Radio Access Network; UTRAN Overall Description (Release 5)," 3GPP TS 25.401 v5.1.0 (Oct. 2001).

3rd Generation Partnership Project; "Technical Specification Group Radio Access Network; UTRAN Overall Description (Release 5)," 3GPP TS 25.401 v5.9.0 (Sep. 2004).

3rd Generation Partnership Project; "Technical Specification Group Radio Access Network; UTRAN Overall Description (Release 6)," 3GPP TS 25.401 v6.4.0 (Sep. 2004).

\* cited by examiner (a)

WIRELESS COMMUNICATION SYSTEM HAVING ADAPTIVE THRESHOLD FOR TIMING DEVIATION MEASUREMENT AND METHOD

CROSS-REFERENCE TO RELATED APPLICATIONS

This application is a continuation of U.S. patent application Ser. No. 10/209,398, filed Jul. 30, 2002 now U.S. Pat. No. 6,873,662 which claims the benefit of U.S. Provisional Patent Application Ser. No. 60/357,033, filed Feb. 14, 2002, which are incorporated by reference herein as if fully set forth.

FIELD OF THE INVENTION

The present invention relates to a system and method of wireless communication that determines received signal timing deviation which is used to generate a timing advance for adjusting wireless transmit receive unit (WRTU) transmissions.

BACKGROUND

Wireless communication systems are well known in the prior art. In state-of-the-art multi-user systems, it is common to have multiple users communicate with a common base station where communication signals are transmitted in selectively defined timeslots of system time frames, or radio frames. Generically, the communication stations can be referred to as wireless transmit receive units (WRTUs) whether they are used by a single user or used to support communications with multiple users. In the systems specified in the Third Generation Partnership Project (3GPP), base stations are referred to as Node Bs and a user communicates with a Node B via a User Equipment (UE). A standard 3GPP system radio frame has a duration of ten milliseconds and is divided into multiple timeslots which are selectively allocated for transmission and reception of communication signals. Transmissions from a Node B to UEs are commonly referred to as Downlink (DL) transmissions and transmissions from UEs to a Node B are commonly referred to as Uplink (UL) transmissions.

Timing deviation arises due to the fact that wireless communication signals are not instantaneous. Although traveling at the speed of light, there is a measurable amount of time between transmission of a signal and its reception. That time is directly related to the distance of the signal travels and, for mobile users, that time will change as a mobile UE moves if the distance from the mobile UE to a Node B changes. The travel time of communication signals needs to be taken into account in order for UL and DL communications to be maintained in designated timeslots and other time windows within system time frames.

As currently specified for 3GPP systems, a radio network is composed of one or more mobile terminals or user equipment (UE), and a UMTS Terrestrial Radio Access Network (UTRAN). The UTRAN includes cells, Node-B's for handling the radio interface in a group of one or more cells, and Radio Network Controllers (RNCs) which controls activity within the radio network. A connection through the UTRAN involves routing through one or more RNC, a Node-B, and a cell. The role played by an RNC depends upon its relative position in the connection of a particular UE to the UTRAN. These roles are Serving RNC (SRNC), Drift RNC (DRNC), and Controlling RNC (CRNC). The SRNC is in charge of the radio link between the UTRAN and the UE. The software entities of the SRNC are found within the RNC through which the connection originated (or an RNC selected through the relocation process). The software components within the DRNC provide radio resources to remote SRNC components. The CRNC controls the logical resources of its Node-B's. When a connection is established, its SRNC and CRNC are co-located within the same RNC. In this case, no DRNC exists. If the connection is handed over from one (original) RNC to another (new), the SRNC functionality exists on the original RNC and the DRNC and CRNC functionalities exist on the new RNC. Additional architectural overview may be found in TS 25.401 V3.3.0.

In a 3GPP system, a Time Division Duplex (TDD) radio frame is composed of intermixed UL and DL timeslots in which communication signals in the form of UL and DL bursts are transmitted. A clocking signal for a cell is broadcast on a Synchronization Channel (SCH) by a Node B and defines the Node B's frame of reference with which downlink bursts are synchronized. The UE derives its cell timing from the received SCH signal, delayed by the Node B-UE one-way propagation time. Nominally, with no Timing Advance applied, the UE begins an UL burst at the start of an UL timeslot with respect to its own frame of reference. If there were zero propagation delay, i.e. instantaneous communication, the start of that UL burst would be received at the Node B at exactly the start of the UL timeslot at the Node B's frame of reference. This is depicted in FIG. 1a.

Since it does in fact takes some time for the transmitted signals to travel to the receiver, there is a propagation delay. Accordingly, the UE derived clock, which defines the UE's frame of reference, is delayed from the reference clock in the Node B by the one-way propagation time. In the nominal case of the UE starting an UL burst at the start of an UL timeslot in its own frame of reference, which is already delayed with respect to the Node B's frame of reference, the burst is received at the Node B delayed by the Node B-UE two-way propagation time. This is depicted in FIG. 1b from the Node B's frame of reference.

If the UL bursts shown in FIG. 1b arrive at the Node B beyond some time window, they may not be detected; if they are detected, they maybe be received with degraded quality. Timing Advance means that the UE sends its UL bursts earlier than it otherwise would, i.e., before the start of an UL timeslot in the UE's frame of reference, such that its UL bursts are received at the Node B within that time window in order to facilitate detection and minimize or eliminate signal degradation. With a Timing Advance adjustment that exactly compensates for the two-way propagation delay, the UL and DL bursts are, at the Node B's frame of reference, as reflected in FIG. 1a. Note that the system utilizes a guard period GP so that it can still function if the Timing Advance adjustment does not exactly compensate for the two-way propagation delay.

Timing Advance is conventionally determined with respect to the Node B's frame of reference based on the difference in timing of the received UL burst and the timeslot for which it is designated which is known as Timing Deviation. Because the propagation delay is a function of the travel time of the communication signal, it can change during the course of a communication. This is quite often the case with mobile UEs which change location while being used. Accordingly, after a timing advance is initially set it needs to be adjusted based on changes in Timing Deviation.

Nominally, the amount of Timing Advance is determined in a Radio Network Controller (RNC) associated with the Node B and signaled to the UE. When handing over to a new cell which supports Timing Advance, the UE either 1) autonomously determines the amount of timing advance to use in the new cell or 2) applies no Timing Advance in the new cell if it temporarily utilizes a timeslot which, because of a larger than nominal guard period, is more tolerant of large timing deviations. Once handover is complete, the nominal procedure applies. For the non-handover case, Timing Advance is preferably controlled by a closed loop between the UE, Node B and RNC, as follows:

Uplink bursts are received at Node B.

Node B measures the Timing Deviation of the received bursts, generally once per frame.

Node B reports (non-zero) Timing Deviation measurements to the RNC.

From the Timing Deviation measurements, the RNC initially determines or updates the amount of Timing Advance the UE shall apply.

The RNC signals, via the Node B, to the UE the amount of Timing Advance to apply. Updates are sent only infrequently.

The UE applies the signaled amount of Timing Advance.

In a 3GPP system, the timing deviation measurement is the estimate of the difference in time between when the start of an UL burst is received in a Node B and the start time of its timeslot. Because of multipath, the first chip of a burst can, in effect, arrive at multiple times, the time of the earliest received instance of the UL burst forms the basis of the timing deviation measurement. The UE transmission timing is adjusted with timing advance. The initial value for timing advance is preferably determined by measurement of the timing of a Physical Random Access Channel (PRACH).

Communication transmission bursts in 3GPP systems are specified to contain an identifying midamble. The midamble is used for channel estimation and from this the timing deviation measurement is conventionally made. Usually there is one timing deviation measurement per UE per frame. Thus, for a Dedicated Channel (DCH) having multiple midambles per frame, either one channel response must be selected for the timing deviation measurement or several or all channel responses integrated and a single timing deviation measurement derived.

An uplink burst is "found" by a conventional Channel Estimation function using the Steiner algorithm which, in effect, searches within a time window for the midamble of the burst. Since the start of the midamble is a fixed distance from the start of the burst, detecting the start of the midamble is equivalent to detecting the start of the burst.

Multipath in the propagation channel causes numerous reflections or instances of the burst to be received with various delays; the midambles of these delayed reflections are also detected. The position of the earliest instance of the burst within the detection window forms the basis of the Timing Deviation measurement.

The current 3GPP standard inconsistently refers to "Timing Deviation" as both a measured quantity accurate to ±½ chip accuracy and resolution of ¼ and a signaled quantity with resolution of four chips. To distinguish these, "Timing Delay" is sometimes used to refer to the measurement itself and then "Timing Deviation" is used to refer to the signaled measurement.

The concept of the detection window is derived from the Steiner channel estimation algorithm, a correlator-like algorithm which yields the time of a midamble detection. FIG. 2 shows five examples of midambles at increasing points in time with respect to the correlator extent. Shown is the parameter notation of the 3GPP standard and numerical examples of these parameters in parentheses for the case of a 3GPP Burst Type 1 which permits eight midamble shifts, $K_{CELL}=8$. The midamble shifts enable multiple UEs to transmit to a Node B in the same timeslot. The Steiner algorithm process enables each UE's signals to be separated from the others based on the shift of that UE's midamble and allows for the Timing Delay measurement of any given received midamble, provided two UE's are not using the same midamble shift at the same time. Accordingly, the five examples illustrated could represent different instances of received signals from one particular UE depending on the two-way propagation distance and the amount of applied Timing Advance.

In FIG. 2a, the midamble denoted (1) occurs before the correlator start and is only partially within the correlator extent, the midambles denoted (2) through (4) are fully within the correlator extent and the midamble denoted (5) is, as is midamble (1), only partially within the correlator extent. FIG. 2b depicts the superposition of the ideal channel responses to these five midambles. Midamble (2) results in an impulse at the start of the channel estimation output, midamble (3) results in an impulse in the middle and midamble (4) results in an impulse at the end. Midambles (1) and (5), being not fully contained within the correlator extent, yield nothing in the channel response of the proper midamble shift; dashed lines represent where they appear in the channel responses for adjacent midamble shifts.

FIG. 2a illustrates that a midamble starting at any one of the first W (57) chip positions results in a corresponding impulse in the channel response, since the entire midamble is detected within the correlator extent. This is what is referred to as the detection window. Note that by utilizing this concept, the actual midamble length is not needed in the analysis of midamble arrival time and the window can be viewed as that time within which the start of the midamble occurs or arrives. Since the midamble is always a fixed number of chips from the start of the burst, by finding the start position, i.e. start time, of the midamble, the arrival time of the start of the burst becomes known. Although these two arrival times are clearly different, they are often referenced interchangeably due to their direct correlation with each other.

Detection windows are the time periods in which a single instance of the Steiner algorithm searches for midambles. The Steiner algorithm searches for the start of K midambles (in actuality, K distinct circular shifts of one midamble code) within a given temporal detection window. The size of the detection window is a function of burst type and whether extended midambles are enabled. Literally, the "detection" window extent includes the midamble length, but for the purpose of Timing Deviation it is easier to think of the window as being that in which the start of the midamble may occur.

A midamble starting anywhere within the length-W detection window will yield, in the absence of noise and interference, a detection with energy proportional to the square of the length of the correlator ($K \times W$) for its midamble shift k. A midamble start occurring (even one chip) before the start of the window or W or more chips after the start of the detection window will yield no detection of midamble shift k, and instead will result in a detection of midamble shift k−1 or k+1.

The length of the Detection Windows is a function of midamble length and maximum number of midamble shifts.

Various examples for 3GPP specified bursts are given in Table 1.

TABLE 1

Detection Window and Midamble Lengths

| Burst Type | Maximum Number of Midamble Shifts, K | Midamble Length, Lm, chips | Channel Response and Detection Window Length, W, chips |
|---|---|---|---|
| 1 | 8 | 512 | 57 |
| 1 | 16 | 512 | 28 or 29 |
| 2 | 3 | 256 | 64 |
| 2 | 6 | 256 | 32 |
| 3 | 4 | 512 | 114 |

Note that for the case of Burst Type 1, K=16, the Detection Window size is given as "28/29." This is because of an anomaly of the midamble shift allocation scheme inherent to the Steiner algorithm, in which the first eight midamble shifts (k=1 through 8) have channel responses of 29 chips and the second eight (k=9 through 16) have channel responses of 28 chips.

A simplified example of determining the Timing Delay measurement from the channel estimate is given in FIG. 3 which shows the magnitude-square of a complex channel estimate for a $k^{th}$ one of the K shifted midambles output from the Steiner algorithm. Note that a practical implementation can use an approximation for the magnitude square, e.g. sum(max(1,Q)+min(1,Q)/2). The horizontal axis of the X-Y plot represents the time duration of the detection window. Depicted are three impulses crossing a threshold based on some ambient noise level. These three impulses are detections of three instances of the kth midamble shift.

The distance of each impulse from the left edge of the window is the start time of the midamble shift instance with respect to the start time of the detection window, or the time offset; the height shows the energy attributed to the midamble shift. Note that the start of the window is not necessarily the start of the uplink timeslot. The leftmost impulse is the earliest of the three and thus its time offset is used for the Timing Deviation measurement.

In the example shown in FIG. 3, a later detection is received with more energy than the earliest one, whose time is tagged as $t_{delay}$. The relative energies of the detections are not a factor; that an energy measurement of the channel estimate crosses the threshold is sufficient.

Preferably, the Node B receiver operates at 2× oversampling, i.e., sampling at twice the chip rate or a sampling period of one-half chip. The Channel Estimation function takes the half-chip sampled sequence and separates it into two (alternating even and odd) chip-rate sequences, each of which is separately input to an instance of the Steiner algorithm. This results in two length-K×W channel estimates per burst. Conceptually, i.e., not necessarily physically, the two channel estimates can be interleaved to form one length-2KW, half-chip sampled channel estimate, and used to compute Timing Deviation. Using the half-chip channel estimate, the Timing Deviation can easily be determined to the desired accuracy and the precision of current 3GPP standards. These functions are depicted in FIG. 4.

Because of the 2× oversampling, a single instance of a midamble in the magnitude-squared interleaved channel estimate will appear not as a single line as depicted in FIG. 3, but as a pulse with some time extent whose shape is related to the root raised cosine chip pulse. FIG. 5 shows an example of the magnitude-squared interleaved channel estimate for a propagation channel similar to that shown in FIG. 3. As in FIG. 3, the distinct pulses, or clusters, in FIG. 5 represent multipath reflections that are many chips apart. Standard propagation models currently used by Working Group 4 (WG4) generally have multipath reflections at single-chip distances. In these cases, the response is the coherent sum of partially overlapped pulses. An example of this is depicted as the response in FIG. 6, in which the individual pulses cannot be resolved.

If receiver diversity is used in the Node B, there are, in effect, two instances of the receiver shown in FIG. 4. The simplest scheme for measuring timing deviation given in a diversity receiver is to simply employ two instances of the algorithms for each of the two receivers and choose the earlier measurement to report as timing deviation.

Measuring timing offset using the interleaved channel response requires identifying the earliest midamble detection, noting its time offset and, if necessary, refining the measurement to the required precision. When these steps have been completed, the final Timing Deviation measurement is formed.

The first step in measuring time offset from the interleaved channel estimate is identical to that in the simplified (non-interleaved) example described above, e.g., find the earliest midamble shift instance above the threshold and note its timing offset. Once found, it is tagged as $t_{delay}$. This is depicted in FIG. 7. To avoid applying too much Timing Advance, the measurement is preferably rounded-down.

In 3GPP systems, the full range of the Timing Deviation measurement is ±256 chips as set forth in TS25.427 V4.4.0 sect 6.3.3.7 and TS 25.435 V4.4.0 sect 6.2.7.6. The possible "negative" value and the extent significantly exceeds the width of the largest detection window, which is 64 chips. Negative Timing Deviation means that a burst is being received before the start of the timeslot. This occurs when too much Timing Advance is applied by a UE for UL bursts. To measure negative Timing Deviation, either the detection window must start before the start of the timeslot, or an additional search must be performed before the time of the search which begins at the start of the timeslot.

The above description of the Timing Deviation measurement assumes a single timing offset measurement from a single channel estimate. In 3GPP systems, however, there are several cases in which there are multiple opportunities to measure timing offset which must yield one Timing Deviation measurement. One value of Timing Deviation for dedicated channels (DCHs) of one connection is reported once per radio frame per TS25.427 V4.4.0 sect 5.6, but there are many measurement opportunities of timing delay per radio frame: the UE can, theoretically, transmit one or two midambles per UL timeslot in up to 13 UL timeslots per frame, or 26 such opportunities. There are several possible schemes for creating one Timing Deviation measurement from the possibly many opportunities:

1. Choose just one of the many opportunities.
2. Make the up to 26 independent measurements of timing delay and combine them with some function, possibly picking the minimum or the average value.
3. For two midambles per timeslot, coherently combine the two channel estimates and make one measurement of timing delay, and choose the minimum timing delay for the up to 13 UL timeslots, as in 1) above
4. Coherently combine the up to 26 channel estimates and make a single measurement of timing delay.

Performance of the schemes can be determined by simulation study, although experience suggests that coherent combination is the preferred scheme.

The threshold depicted in FIG. 5 and FIG. 6 plays the crucial role for measuring the timing deviation. The Channel Estimation Post-Processing function detects midambles using a CFAR-type threshold. Conventionally this threshold is based on an interference noise estimate. The working assumption for Post Processing is that the nominal value of the threshold should correspond to a $10^{-2}$ False Alarm rate (FAR). However, it is not clear that the $10^{-2}$ FAR threshold value allows the Timing Deviation algorithm to meet the "90% of the time" accuracy requirement specified in TS 25.123. V4.4.0 sect 9 for the Timing Deviation measurement.

A $10^{-2}$ FAR threshold means that, on average, approximately one out of every two to four (depending on W) channel estimates will contain one false detection of a midamble along with however many true detections there are. However, a false detection will only result in an incorrect timing deviation measurement if it occurs before the true first detection; this reduces the above cited rate of incorrect timing deviation reports. Reducing the distance between the Timing Advance setpoint and the left edge of the window, further reduces that rate. An intuitive guess is that the $10^{-2}$ FAR rate is probably acceptable.

Applicants' have discovered that a variable threshold which is set depending on the channel energy improves the detection performance significantly. In the oversampled case, each path yields an RRC shaped response. If there is a true path, then two out of three consecutive samples should be above the threshold. The sample location that contains the maximum energy out of three samples is declared as a true timing delay.

SUMMARY

A system and method of wireless communication determines received signal timing deviation which is used to generate a timing advance for adjusting User Equipment (UE) transmissions. An adaptive threshold for measuring the timing deviation is set based on the energy level of received UE signals. UE signal samples which exceed the threshold are evaluated to determine timing deviation.

Preferably, the UEs transmit signals in bursts designated for specific timeslots of system time frames as specified in 3GPP standards and the energy level of at least a portion of a received UE burst is computed to determine the energy level used to set the Timing Deviation threshold. Specifically, the preferred UE bursts include a midamble and the energy level of the midamble of a received UE burst, which includes all received multipath instances, is computed to determine the energy level used to set the threshold.

The system has a receiver for receiving UE transmissions and associated processing circuitry which processes received UE signals and sets a threshold for measuring timing deviation of a received UE signal based on the energy level of the received UE signal and compares signal samples which exceed the threshold to determine timing deviation. Preferably, the processing circuitry is configured to define a reception window based on the type of UE burst received and a timeslot designated for reception, to sample UE burst midambles received within the defined window, to perform channel estimation to determine midamble channel impulse responses, to compute the energy level of the midamble of a received UE burst based on a selected combination of elements of the midamble channel impulse response, to determine a threshold based on the midamble channel impulse response, and to apply that threshold to measure the timing deviation.

Specifically, the preferred processing circuitry is configured to sample UE burst midambles at twice the chip rate of the UE bursts, perform channel estimation on even and odd samples of received midambles to produce oversampled midamble channel impulse responses, compute the energy level of the midamble of a received UE burst based on a summation of the squares, i.e. magnitude square, of the oversampled midamble channel impulse responses and determine timing deviation based on oversampled midamble channel impulse responses whose square exceeds the threshold. Where the UE bursts have a midamble sequence of one of K shifts of a predetermined sequence, a number k, which is $\leq K$, of UE bursts are received within the same designated timeslot, each having a different midamble shift, the preferred processing circuitry is configured to sample the k received UE burst midambles at twice the chip rate, perform channel estimation using the Steiner algorithm on even and odd samples of received midambles to produce oversampled midamble channel impulse responses for each of the k received midambles, compute the energy level of the midamble of at least one of the k received UE bursts based on a summation of the squares of the oversampled midamble channel impulse responses for that burst and determine timing deviation based on the oversampled midamble channel impulse responses for that burst whose squares exceeds the threshold. In such case, the processing circuitry is configured to set the threshold at a value equal to the computed energy level multiplied by a constant which is in the range of 0.01 and 0.05, preferably 0.025.

The processing circuitry is also preferably configured to use the determined timing deviation to generate a timing advance signal. The preferred system includes a transmitter which transmits the generated timing advance signal to the UE which transmitted the burst for which the timing deviation was determined. Preferably, the processing circuitry is embodied in a Radio Network Controller (RNC) and the receiver and transmitter are embodied in a Node B of a Third Generation Partnership Project (3GPP) system. After transmitting the generated timing advance signal to the UE which transmitted the burst for which the timing deviation was determined, that UE uses the received timing advance signal to adjust the timing of the UE's transmissions.

Other objects and advantages of the present invention will be apparent to those of ordinary skill in the art from the following description of a presently preferred embodiment.

BRIEF DESCRIPTION OF THE DRAWING(S)

DETAILED DESCRIPTION OF THE PREFERRED EMBODIMENT(S)

A timing deviation measurement is an estimate of the difference in time between when the start of an UL burst is received in a Node B and the start time of its timeslot. Uplink bursts are found by channel estimation preferably the Steiner algorithm where multiple bursts having different midamble shifts are received. A simplified example of determining the timing deviation measurement is to find the earliest path of the channel impulse response above a predetermined threshold. Where 2× oversampling is employed, a single instance of a midamble in a magnitude-squared interleaved channel impulse response appears as a root-raised cosine (RRC) pulse shape. In 3GPP, the desired accuracy of the timing deviation measurement is ±½ chip accuracy and granularity is ¼ chip.

In accordance with the present invention, a preferred procedure of the timing deviation measurement where 2× oversampling is used in a 3GPP system is as follows:

Step 1: For UL bursts received in a selected timeslot, compute the midamble energy of each, i.e., $$E_k = \sum_{i=0}^{2W-1} |h_i^{(k)}|^2,$$

where $h_i^{(k)}$ represents the oversampled channel impulse response of the kth midamble of up to K bursts, each having a different midamble shift, where K is the number of available midamble shifts for the type of UL burst, where each h term has been subjected to a threshold to eliminate likely noise-only terms.

Step 2: Set the threshold as $\eta = cE_k$, where c is a selected constant, and find the earliest path window, i.e., if two out of three consecutive samples are above the threshold then these sample indices and their energy are stored.

Step 3: Find the maximum among three samples and its time index. This time index is declared as the earliest path in this channel impulse response of the kth midamble.

The constant c is preferably set based on conducting simulations. For the oversampling case above, c is preferably between 0.01 and 0.05 with 0.025 or 2.5% of midamble energy being a presently preferred value. Simulations may be used to optimize the value of c, but as reflected below, the method performs well with different values of c in the given range.

Figure 1A:
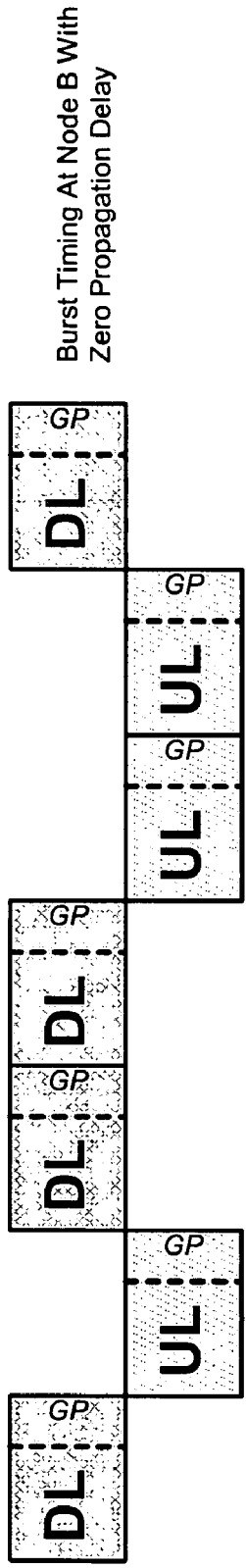
FIG. 1a is a schematic diagram of uplink (UL) and downlink (DL) communication bursts within consecutive time slots at a base station having zero propagation delay or a perfect timing advance.
Figure 1B:
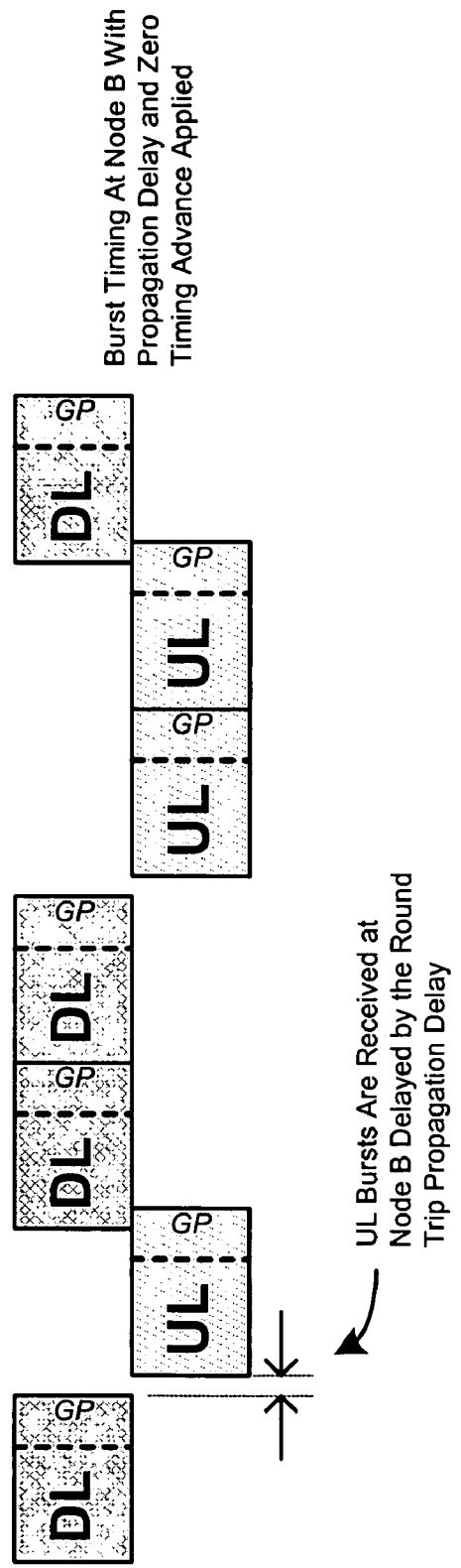
FIG. 1b is a schematic diagram of uplink (UL) and downlink (DL) communication bursts within consecutive time slots at a base station having a propagation delay without timing advance applied.
Figure 2A:
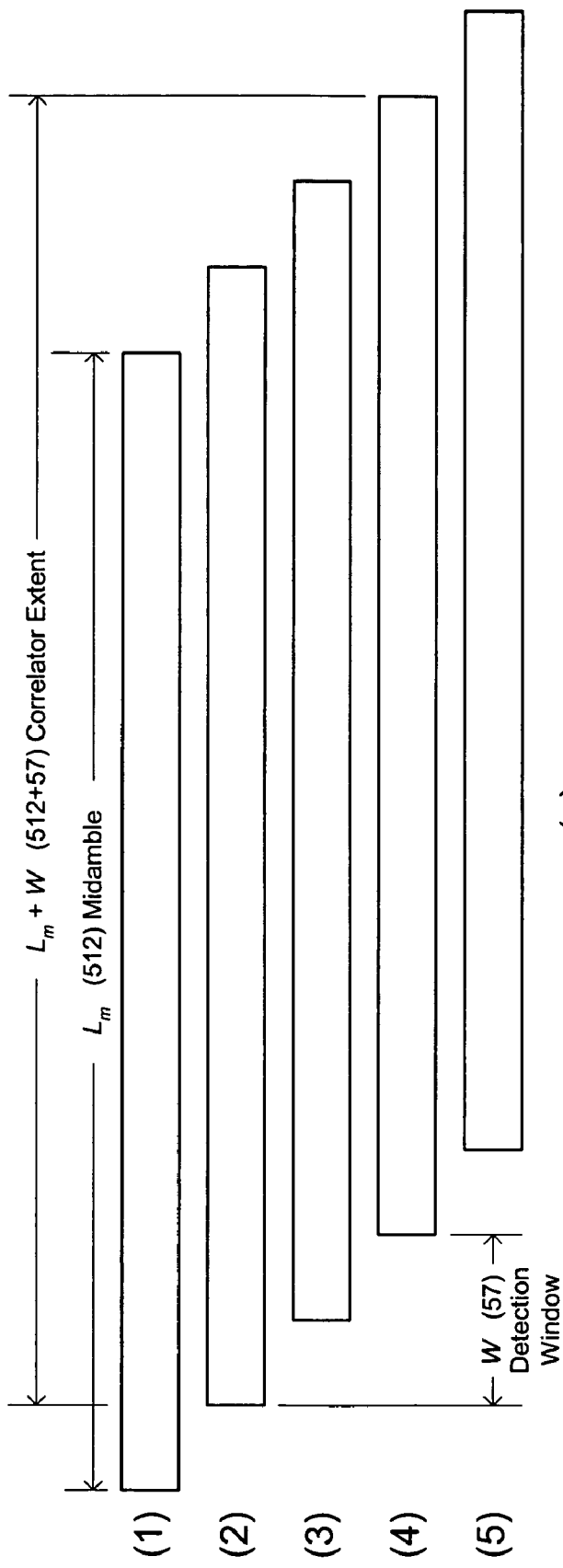
FIGS. 2a and 2b are graphic illustrations representing five transmission burst midambles with respect to a detection window of a correlator extent.
Figure 2B:
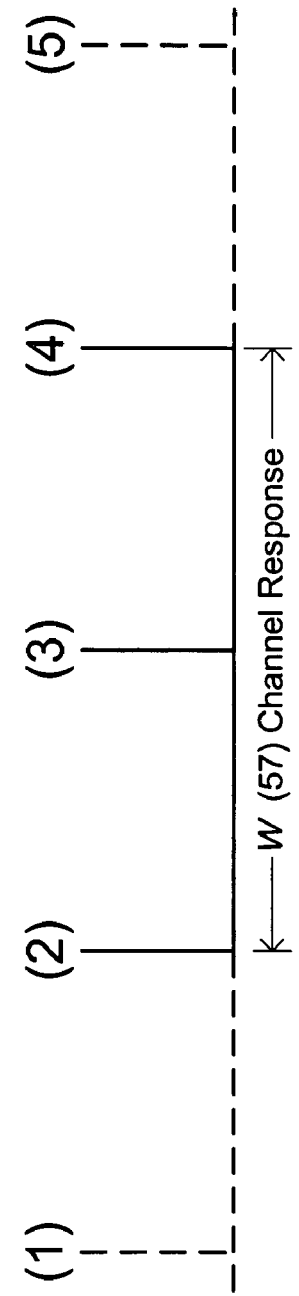
Figure 3:
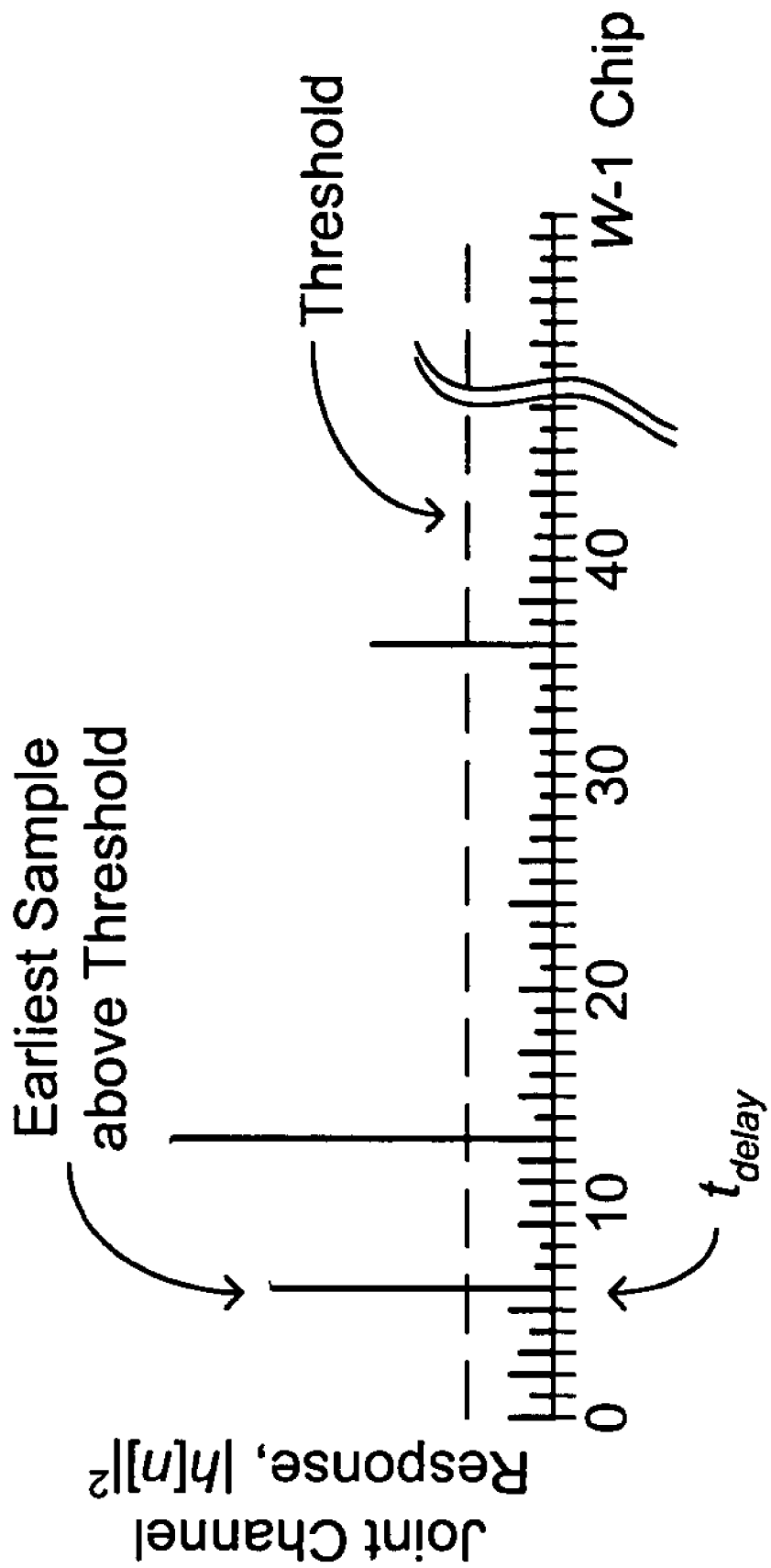
FIG. 3 is a graphic illustration of a joint channel response.
Figure 4:
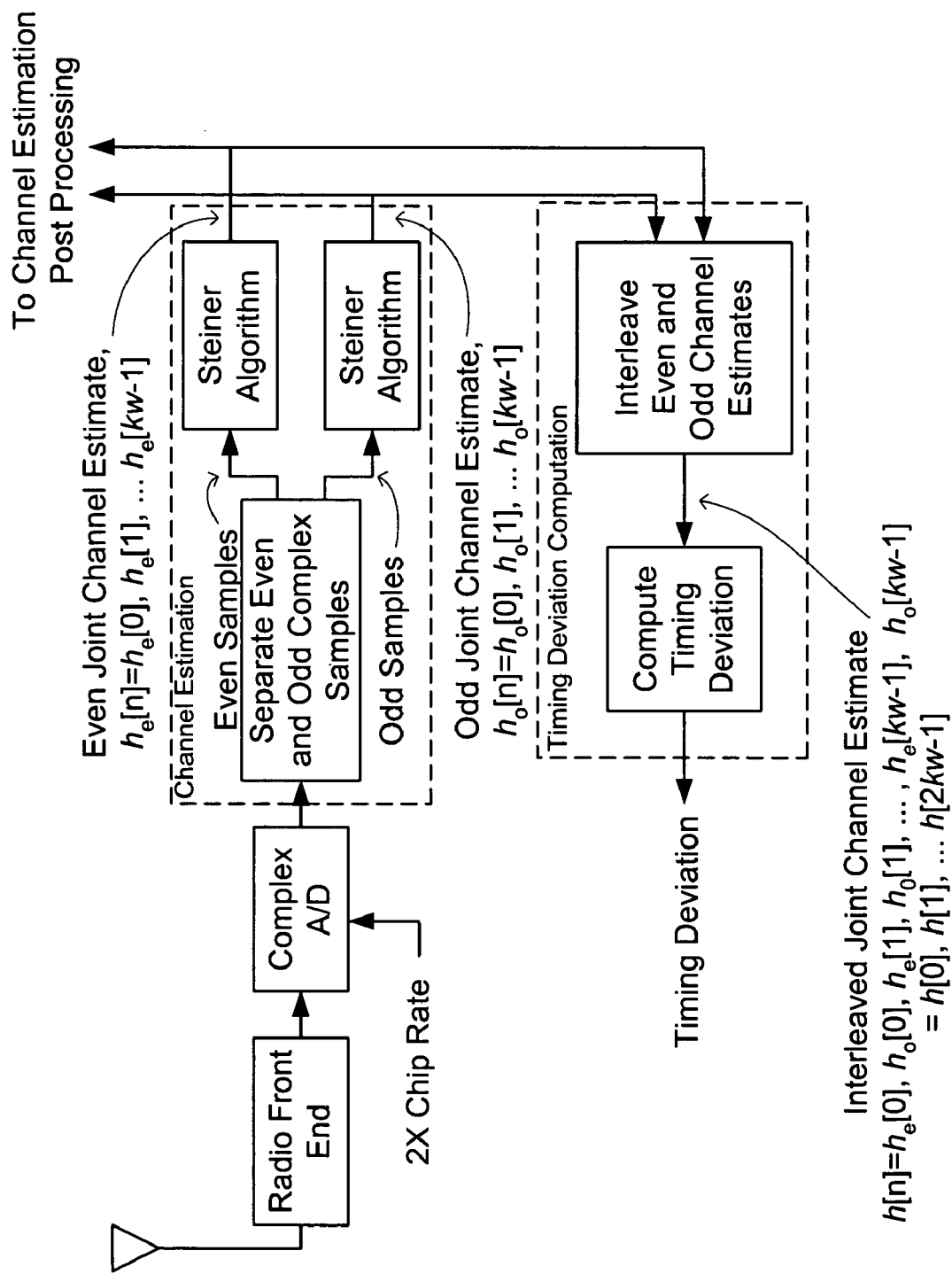
FIG. 4 is a schematic diagram of a communication system which receives UL bursts and computes timing deviation.
Figure 5:
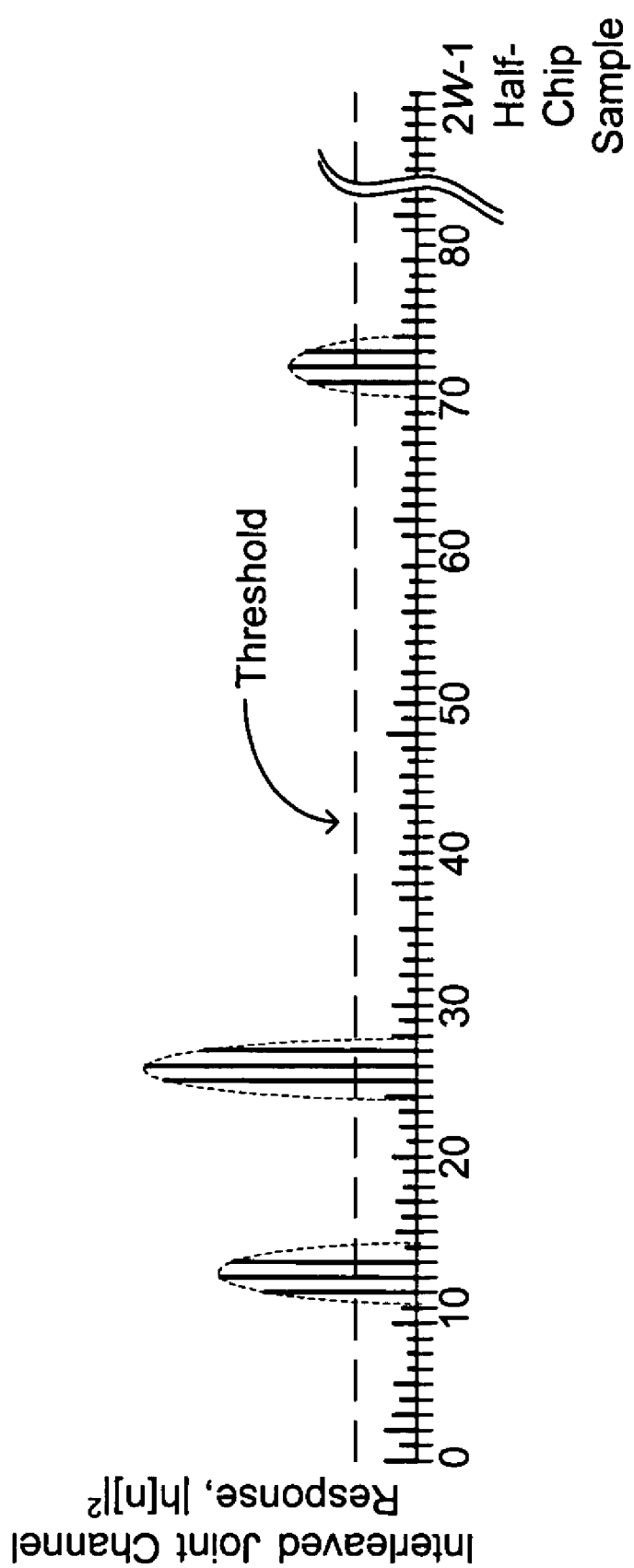
FIG. 5 is a graphic illustration of an interleaved joint channel response similar to FIG. 3.
Figure 6:
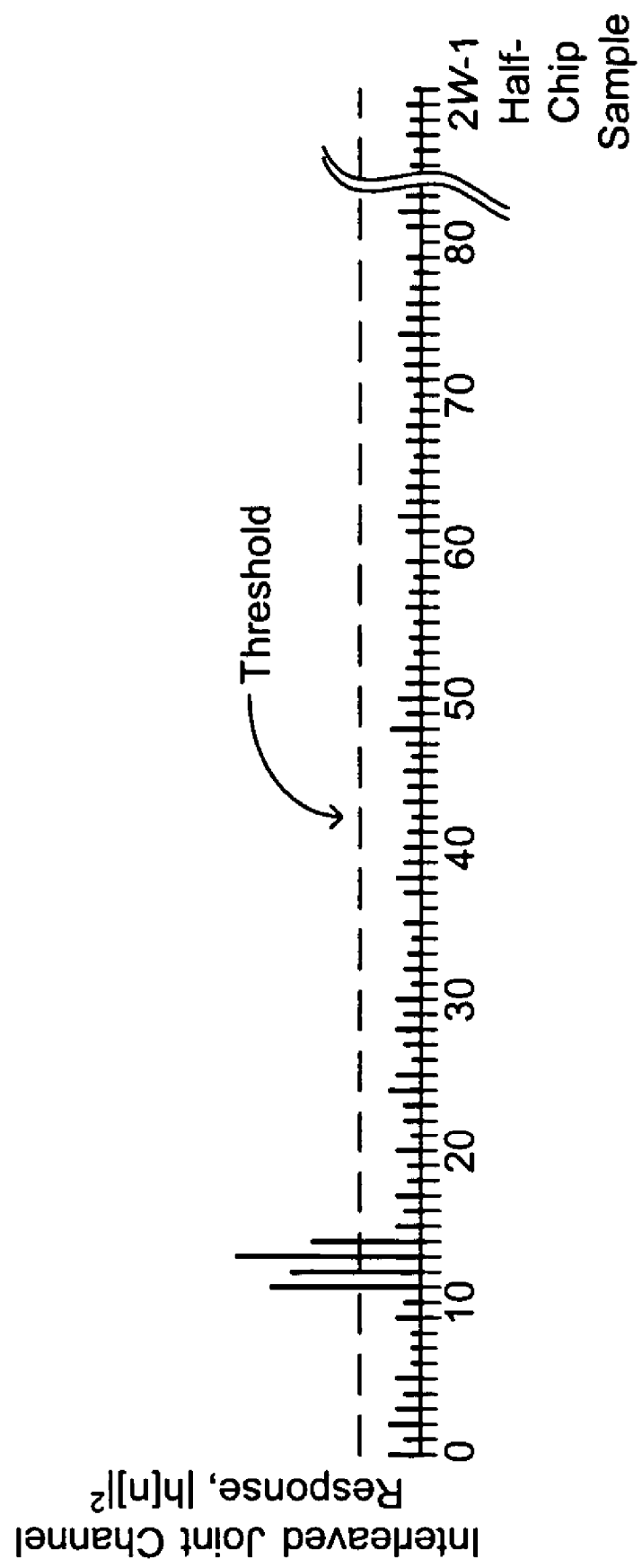
FIG. 6 is a graphic illustration of a realistic channel response for a WG4 propagation channel.
Figure 7:
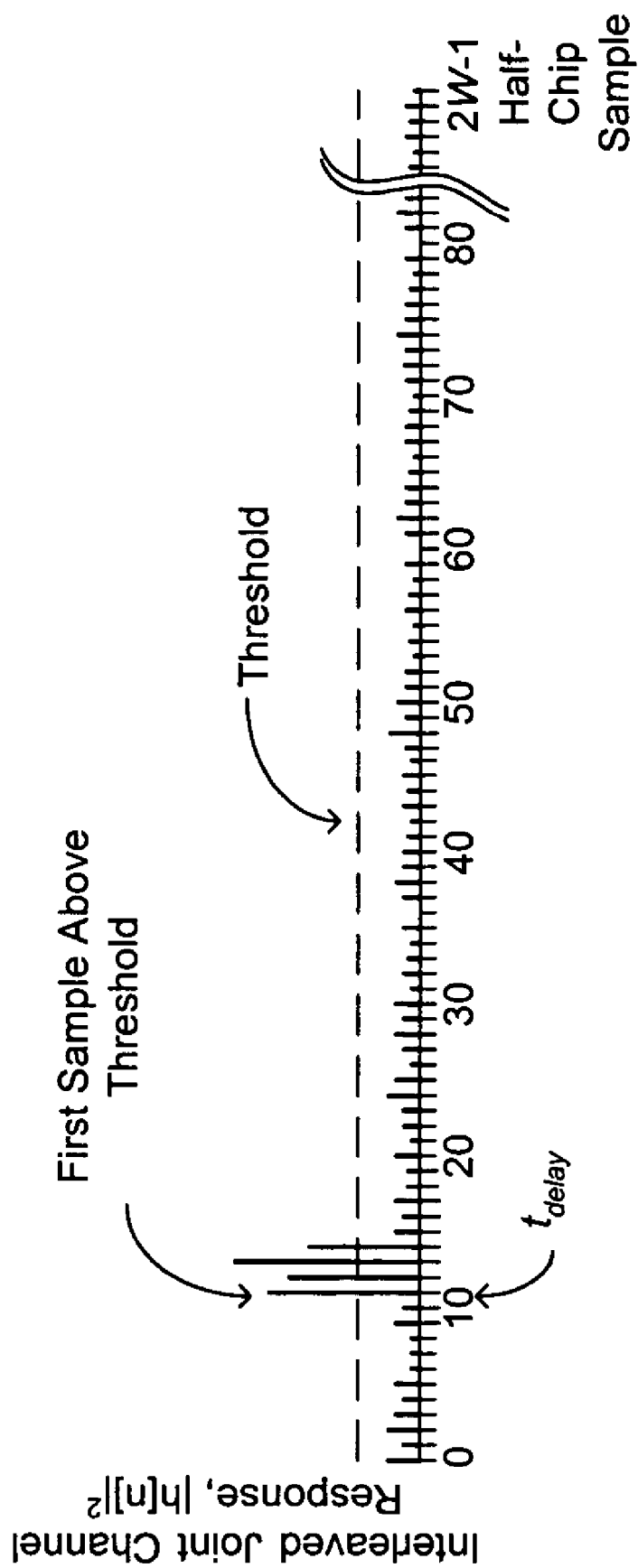
FIG. 7 is a graphic illustration of the determination of timing deviation based on the joint channel response of FIG. 6.
Figure 8:
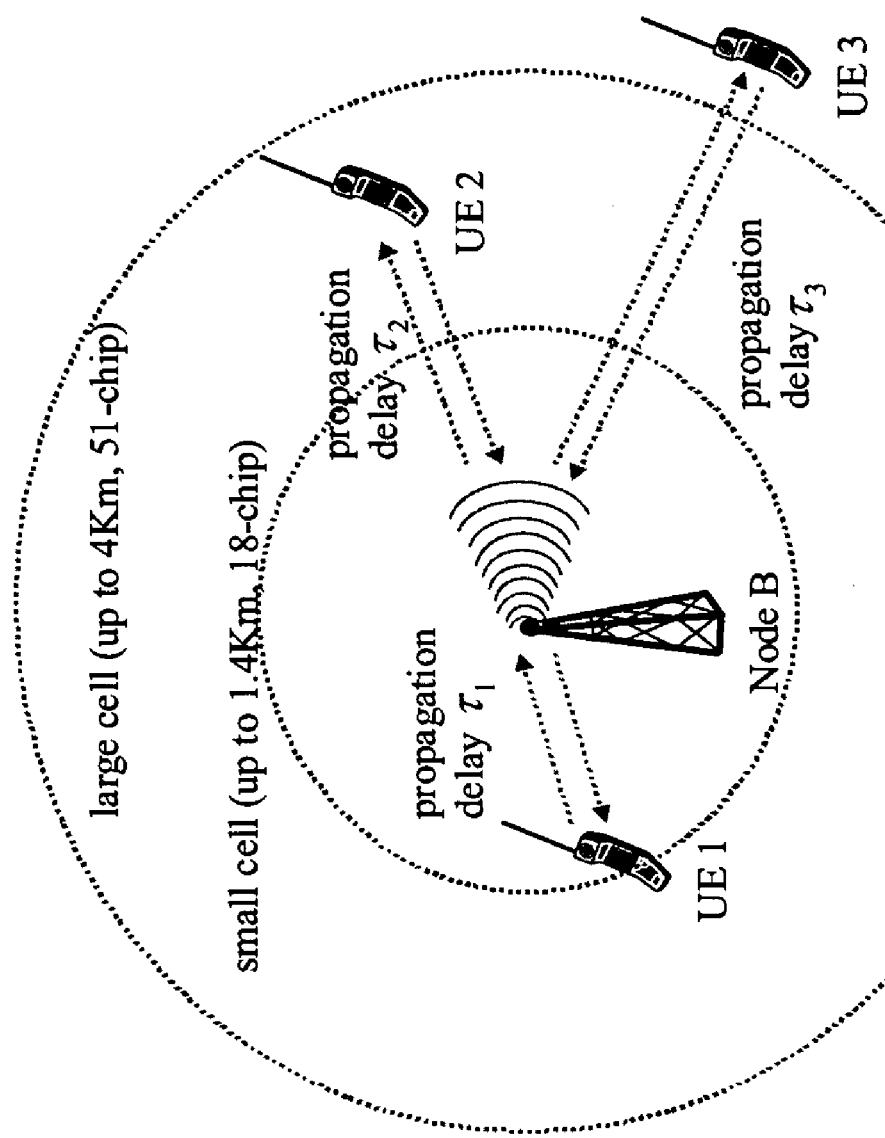
FIG. 8 is a schematic illustration of multiple UEs communicating with a Node B of a 3GPP system showing two different cell sizes.

Using the above procedures, the timing deviation is measured for the kth midamble. The novel threshold determination which is adaptively set based on the determined midamble energy provides a reliable method of timing deviation measurement which is readily implemented in an RNC processor in conjunction with processing channel estimation as illustrated in FIG. 4. The processor is configured to compute timing deviation in a conventional manner, but to first make the additional computations set forth in Steps 1 and 2 above to determine the threshold used in the timing deviation computation.

A variety of simulations were conducted based on the above described preferred method. These included simulations using an Additive White Gaussian Noise (AWGN) channel and three different channels as specified by 3GPP Working Group 4 (WG4), known in the art as WG4 Case 1, WG4 Case 2 and WG4 Case 3 channels.

If a UE has a multiple midamble, there are several methods to measure the timing deviation: (1) Coherent combining of the multiple midamble and proceed timing deviation measurement, (2) Select one midamble and proceed timing deviation measurement and (3) Proceed timing deviation measurement for each midamble and select earliest. Similarly, in the receiver diversity the above mentioned methods can be applied. In all cases the adaptive threshold procedure can be employed.

While the invention has been described in conjunction with a preferred embodiment based on current 3GPP specifications, it is readily adaptable by one of ordinary skill in the art beyond the specifically described embodiment.

What is claimed is:

1. A method of facilitating wireless communication comprising:
    setting a threshold for measuring timing deviation based on an energy level of a UE signal and evaluating signal samples which exceed the threshold to determine timing deviation;
    computing an energy level of a midamble of a received UE burst to determine the energy level used to set the threshold; and
    defining a reception window based on a type of UE burst received and a timeslot designated for reception, sampling UE burst midambles received within the defined window and performing channel estimation to determine midamble channel impulse responses wherein the energy level of the midamble of a received UE burst is computed based on a selected combination of elements of the midamble channel impulse responses and the timing deviation is determined based on a relationship of midamble channel impulse responses to the threshold.

2. The method according to claim 1 further wherein the UE bursts have a predefined chip rate, the sampling of UE burst midambles is at twice the chip rate, the channel estimation is performed on even and odd samples of received midambles to produce oversampled midamble channel impulse responses, the energy level of the midamble of a received UE burst is computed based on a summation of squares of non-noise oversampled midamble channel impulse response elements and the timing deviation is determined based on oversampled midamble channel impulse responses whose square exceeds the threshold.

3. The method according to claim 1 wherein the UE bursts have a predefined chip rate and a midamble sequence of one of K shifts of a predetermined sequence, a number k, which is ≦K, of UE bursts are received within the same designated timeslot, each having a different midamble shift, the sampling of the k received UE burst midambles is at twice the chip rate, the channel estimation is performed using the Steiner algorithm on even and odd samples of received midambles to produce oversampled midamble channel impulse responses for each of the k received midambles, the energy level of the midamble of at least one of the k received UE bursts is computed based on a summation of squares of non-noise oversampled midamble channel impulse responses for that burst and the timing deviation is determined based on the oversampled midamble channel impulse responses for that burst whose squares exceeds the threshold.

4. The method according to claim 3 further comprising using the determined timing deviation to generate a timing advance signal and transmitting the generated timing advance signal to the UE which transmitted the burst for which the timing deviation was determined.

5. The method according to claim 4 further comprising receiving the generated timing advance signal by the UE which transmitted the burst for which the timing deviation was determined and using the timing advance signal to adjust transmission timing of the UE.

6. An apparatus for wireless communication comprising:
a receiver for receiving UE transmissions:
processing circuitry configured to process received UE signals, to set a threshold for measuring timing deviation of a received UE signal based on an energy level of the received UE signal, and to compare signal samples which exceed the threshold to determine timing deviation;
the processing circuitry configured to compute an energy level of the midamble of a received UE burst to determine the energy level used to set the threshold; and
the processing circuitry configured to define a reception window based on a type of UE burst received and a timeslot designated for reception, to sample UE burst midambles received within the defined window, to perform channel estimation to determine midamble channel impulse responses, to compute the energy level of the midamble of a received UE burst based on a selected combination of the midamble channel impulse responses and to determine timing deviation based on a relationship of midamble channel impulse responses to the threshold.

7. The apparatus according to claim 6 wherein the UE bursts have a predefined chip rate and the processing circuitry is configured to sample UE burst midambles at twice the chip rate, perform channel estimation on even and odd samples of received midambles to produce oversampled midamble channel impulse responses, to compute the energy level of the midamble of a received UE burst based on a summation of squares of non-noise oversampled midamble channel impulse responses and to determine timing deviation based on oversampled midamble channel impulse responses whose square exceeds the threshold.

8. The apparatus according to claim 6 wherein the UE bursts have a predefined chip rate and a midamble sequence of one of K shifts of a predetermined sequence, a number k, which is ≦K, of UE bursts are received within the same designated timeslot, each having a different midamble shift, and the processing circuitry is configured to sample the k received UE burst midambles at twice the chip rate, to perform channel estimation using the Steiner algorithm on even and odd samples of received midambles to produce oversampled midamble channel impulse responses for each of the k received midambles, to compute the energy level of the midamble of at least one of the k received UE bursts based on a summation of squares of oversampled midamble channel impulse responses for that burst and to determine timing deviation based on the oversampled midamble channel impulse responses for that burst whose squares exceeds the threshold.

9. The apparatus according to claim 8 wherein the processing circuitry is configured to use the determined timing deviation to generate a timing advance signal and further comprising a transmitter configured to transmit the generated timing advance signal to the UE that had transmitted the burst for which the timing deviation was determined.

10. The apparatus according to claim 9 wherein the processing circuitry is embodied in a Radio Network Controller (RNC) and the receiver and transmitter are embodied in a Node B.

11. A method for a UMTS Terrestrial Radio Access Network (UTRAN) comprising:
sampling received communication signals transmitted by a UE by the UTRAN;
determining energy level of multiple samples of the received signals;
determining a timing deviation of the received signals by evaluating signal samples which exceed a threshold where the threshold for measuring the timing deviation is set based on the energy level of the received signals;
using the determined received signal timing deviation to adjust the UE transmission of communication signals;
computing the energy level of the midamble of a received burst to determine the energy level used to set the threshold; and
defining a reception window based on a type of burst received and a timeslot designated for reception, sampling burst midambles received within the defined window and performing channel estimation to determine midamble channel impulse responses wherein the energy level of the midamble of a received burst is computed based on a selected combination of elements of the midamble channel impulse responses and the timing deviation is determined based on a relationship of midamble channel impulse responses to the threshold.

12. The method according to claim 11 further wherein the bursts have a predefined chip rate, the sampling of burst midambles is at twice the chip rate, the channel estimation is performed on even and odd samples of received midambles to produce oversampled midamble channel impulse responses, the energy level of the midamble of a received burst is computed based on a summation of the squares of non-noise oversampled midamble channel impulse response elements and the timing deviation is determined based on oversampled midamble channel impulse responses whose square exceeds the threshold.

13. The method according to claim 12 wherein the threshold is set at a value equal to the computed energy level multiplied by a constant which is determined by conducting simulations.

14. The method according to claim 11 wherein the bursts have a predefined chip rate and a midamble sequence of one of K shifts of a predetermined sequence, a number k, which is ≦K, of bursts are received within the same designated timeslot, each having a different midamble shift, the sampling of the k received burst midambles is at twice the chip rate, the channel estimation is performed using the Steiner algorithm on even and odd samples of received midambles to produce oversampled midamble channel impulse responses for each of the k received midambles, the energy level of the midamble of at least one of the k received bursts is computed based on a summation of the squares of the non-noise oversampled midamble channel impulse responses for that burst and the timing deviation is determined based on the oversampled midamble channel impulse responses for that burst whose squares exceeds the threshold.

15. The method according to claim 14 wherein the threshold is set at a value equal to the computed energy level multiplied by a constant which is in the range of 0.01 and 0.05.

16. The method according to claim 14 further comprising using the determined timing deviation to generate a timing advance signal and transmitting the generated timing advance signal to the UE which transmitted the burst for which the timing deviation was determined.

17. The method according to claim 16 further comprising receiving the generated timing advance signal by the UE which transmitted the burst for which the timing deviation was determined and using the timing advance signal to adjust transmission timing of that UE.

18. A UMTS Terrestrial Radio Access Network (UTRAN) comprising:

a receiver for receiving transmissions;

processing circuitry configured to process received communication signals and set a threshold for measuring timing deviation of a received signal based on the energy level of the received signal;

said processing circuitry configured to compare signal samples which exceed the threshold to determine timing deviation;

said processing circuitry configured to compute the energy level of the midamble of a received burst to determine the energy level used to set the threshold; and said processing circuitry configured to define a reception window based on the type of UE burst received and a timeslot designated for reception, to sample burst midambles received within the defined window, to perform channel estimation to determine midamble channel impulse responses, to compute the energy level of the midamble of a received burst based on a selected combination of the midamble channel impulse responses and to determine timing deviation based a relationship of midamble channel impulse responses to the threshold.

19. The UTRAN according to claim 18 further wherein the bursts have a predefined chip rate and the processing circuitry is configured to sample burst midambles at twice the chip rate, to perform channel estimation on even and odd samples of received midambles to produce oversampled midamble channel impulse responses, to compute the energy level of the midamble of a received burst based on a summation of the squares of non-noise oversampled midamble channel impulse responses and to determine timing deviation based on oversampled midamble channel impulse responses whose square exceeds the threshold.

20. The UTRAN according to claim 19 wherein said processing circuitry is configured to set the threshold at a value equal to the computed the energy level multiplied by a constant.

21. The UTRAN according to claim 18 wherein the bursts have a predefined chip rate and a midamble sequence of one of K shifts of a predetermined sequence, a number k, which is $\leq K$, of UE bursts are received within the same designated timeslot, each having a different midamble shift, and the processing circuitry is configured to sample the k received UE burst midambles at twice the chip rate, to perform channel estimation using the Steiner algorithm on even and odd samples of received midambles to produce oversampled midamble channel impulse responses for each of the k received midambles, to compute the energy level of the midamble of at least one of the k received UE bursts based on a summation of the squares of the oversampled midamble channel impulse responses for that burst and determine timing deviation based on the oversampled midamble channel impulse responses for that burst whose squares exceeds the threshold.

22. The UTRAN according to claim 21 wherein said processing circuitry is configured to set the threshold at a value equal to the computed the energy level multiplied by a constant which is in the range of 0.01 and 0.05.

23. The UTRAN according to claim 21 wherein said processing circuitry is configured to use the determined timing deviation to generate a timing advance signal and further comprising a transmitter configured to transmit the generated timing advance signal to the UE which transmitted the burst for which the timing deviation was determined.

24. The UTRAN according to claim 23 wherein said processing circuitry is embodied in a Radio Network Controller (RNC) and the receiver and transmitter are embodied in a Node B.

* * * * *

UNITED STATES PATENT AND TRADEMARK OFFICE
CERTIFICATE OF CORRECTION

PATENT NO. : 7,388,933 B2
APPLICATION NO. : 11/000304
DATED : June 17, 2008
INVENTOR(S) : Oh et al.

It is certified that error appears in the above-identified patent and that said Letters Patent is hereby corrected as shown below:

ON THE FACE PAGE

At Item (56), OTHER PUBLICATIONS, page 2, left column, line 2, after "990", delete "Mhz" and insert therefor --MHz--.

At Item (56), OTHER PUBLICATIONS, page 2, left column, line 7, after "3GPP", delete "TSS 25.123" and insert therefor --TS 25.123--.

IN THE SPECIFICATION

At column 1, line 20, after the word "unit", delete "(WRTU)" and insert therefor --(WTRU)--.

At column 1, line 31, after the word "units", delete "(WRTUs)" and insert therefor --(WTRUs)--.

At column 1, line 48, after the word "distance", delete "of".

At column 2, line 30, after the word "fact", delete "takes" and insert therefor --take--.

At column 7, line 23, before the words "have discovered", delete "Applicants'" and insert therefor --Applicants--.

At column 8, line 25, after the word "whose" delete "squares" and insert therefor --square--.

UNITED STATES PATENT AND TRADEMARK OFFICE
CERTIFICATE OF CORRECTION

PATENT NO. : 7,388,933 B2
APPLICATION NO. : 11/000304
DATED : June 17, 2008
INVENTOR(S) : Oh et al.

It is certified that error appears in the above-identified patent and that said Letters Patent is hereby corrected as shown below:

IN THE CLAIMS

At claim 3, column 10, line 55, before the words "of UE bursts", delete "≤ K" and insert therefor --< K--.

At claim 7, column 11, line 37, before the word "perform", insert --to--.

At claim 8, column 11, line 48, after the words "which is", delete "≤ K" and insert therefor --< K--.

At claim 14, column 12, line 48, before the words "of bursts", delete "≤ K" and insert therefor --< K--.

At claim 18, column 13, line 30, after the word "based", insert --on--.

At claim 20, column 14, line 6, after the word "computed", delete "the".

At claim 21, column 14, line 11, before the words "of UE", delete "≤ K" and insert therefor --< K--.

At claim 22, column 14, line 27, after the word "computed", delete "the".

Signed and Sealed this

Twenty-fifth Day of November, 2008

JON W. DUDAS
*Director of the United States Patent and Trademark Office*